(12) United States Patent
Sedwick et al.

(10) Patent No.: US 11,478,037 B2
(45) Date of Patent: Oct. 25, 2022

(54) WIRELESS MICROPHONE SYSTEM FOR AN ARTICLE OF FOOTWEAR

(71) Applicant: MSG Entertainment Group, LLC, New York, NY (US)

(72) Inventors: Larry Sedwick, Suffern, NY (US); Chris Dee, Babylon, NY (US)

(73) Assignee: MSG Entertainment Group, LLC, New York, NY (US)

( * ) Notice: Subject to any disclaimer, the term of this patent is extended or adjusted under 35 U.S.C. 154(b) by 1179 days.

(21) Appl. No.: 15/203,734

(22) Filed: Jul. 6, 2016

(65) Prior Publication Data
US 2018/0007996 A1    Jan. 11, 2018

(51) Int. Cl.
| A43B 3/50 | (2022.01) |
| A43B 5/12 | (2006.01) |
| A43B 21/20 | (2006.01) |
| H02J 7/00 | (2006.01) |
| H04R 1/02 | (2006.01) |
| A43B 13/14 | (2006.01) |

(52) U.S. Cl.
CPC ............ *A43B 3/50* (2022.01); *A43B 5/12* (2013.01); *A43B 13/14* (2013.01); *A43B 21/20* (2013.01); *H02J 7/0027* (2013.01); *H04R 1/028* (2013.01); *H04R 2420/07* (2013.01)

(58) Field of Classification Search
CPC ....... A43B 3/0005; A43B 3/0021; A43B 5/12; A43B 21/20; A43B 13/14; H04R 2420/07
USPC .................................................. 36/137, 139
See application file for complete search history.

(56) References Cited

U.S. PATENT DOCUMENTS

| 3,893,247 | A | * | 7/1975 | Dana, III | A43B 3/36 36/137 |
| 4,253,254 | A | * | 3/1981 | Gill | A43B 3/00 36/139 |
| 4,466,204 | A | * | 8/1984 | Wu | A43B 1/0054 36/132 |
| 4,571,680 | A | * | 2/1986 | Wu | A43B 1/0054 235/105 |

(Continued)

FOREIGN PATENT DOCUMENTS

| CN | 2176033 Y | 9/1994 |
| CN | 201640607 U | 11/2010 |

(Continued)

OTHER PUBLICATIONS

Eric Meijer, "3D Printed Shoes: Combining 3D Printing in Plastics & Steel with Traditional Craftsmanship," 3D Printing Blog, i.materialise, pp. 1-9.

(Continued)

*Primary Examiner* — Alissa J Tompkins
*Assistant Examiner* — Catherine M Ferreira
(74) *Attorney, Agent, or Firm* — Sterne, Kessler, Goldstein & Fox P.L.L.C.

(57) ABSTRACT

An article of footwear that produces an audio component for a performance includes a rigid heel assembly that attaches to the article of footwear. The rigid heel assembly has a cavity with an open end. The cavity houses an audio transmission assembly that includes a transmitter. A microphone converts the audio component of the performance into a digital audio signal and is operatively connected to the audio transmission assembly which wirelessly transmits the digital audio signal of the audio of the performance.

7 Claims, 17 Drawing Sheets

(56) References Cited

U.S. PATENT DOCUMENTS

| | | | | |
|---|---|---|---|---|
| 4,660,305 A * | 4/1987 | Medler | A43B 1/0054 | 36/1 |
| 5,001,852 A | 3/1991 | Schwartz | | |
| 5,343,190 A * | 8/1994 | Rodgers | A43B 1/0036 | 200/61.45 R |
| 5,461,188 A * | 10/1995 | Drago | A43B 3/34 | 36/137 |
| 5,500,635 A * | 3/1996 | Mott | A43B 1/0072 | 310/311 |
| 5,523,741 A * | 6/1996 | Cane | A47G 33/00 | 340/541 |
| 5,615,111 A * | 3/1997 | Raskas | A43B 3/00 | 36/136 |
| 5,649,376 A * | 7/1997 | Lecates, Jr. | A43B 3/0005 | 36/137 |
| 5,748,087 A * | 5/1998 | Ingargiola | A43B 3/0005 | 340/539.1 |
| 5,765,300 A * | 6/1998 | Kianka | A43B 3/0005 | 36/139 |
| 5,855,080 A * | 1/1999 | Van Staden | A43B 3/00 | 36/139 |
| 6,000,149 A * | 12/1999 | Pomerantz | A43B 3/00 | 36/136 |
| 6,788,200 B1 * | 9/2004 | Jamel | A43B 3/00 | 340/539.11 |
| 7,032,331 B2 * | 4/2006 | Tsai | A43B 3/36 | 36/137 |
| 7,114,822 B2 * | 10/2006 | Guzman | A43B 3/0005 | 362/103 |
| 7,188,439 B2 * | 3/2007 | DiBenedetto | A43B 1/0054 | 36/132 |
| 7,219,449 B1 * | 5/2007 | Hoffberg | A43B 3/0026 | 36/88 |
| 7,714,709 B1 * | 5/2010 | Daniel | A43B 3/00 | 340/539.1 |
| 7,758,523 B2 * | 7/2010 | Collings | A43B 3/0005 | 600/592 |
| 8,021,269 B2 * | 9/2011 | Jung | A43B 3/0005 | 482/4 |
| 8,461,979 B2 * | 6/2013 | Case, Jr. | A43B 3/0005 | 340/539.1 |
| 8,644,967 B2 * | 2/2014 | Seiler | A43B 3/00 | 700/94 |
| 9,186,567 B2 * | 11/2015 | Molyneux | A43B 1/0054 | |
| 9,620,100 B2 * | 4/2017 | Ochipa | A43B 13/14 | |
| 2004/0103563 A1 * | 6/2004 | Linge | A43B 3/34 | 36/137 |
| 2004/0172856 A1 * | 9/2004 | Horchler | A43B 3/0005 | 36/137 |
| 2005/0091884 A1 * | 5/2005 | Omstead | A43B 1/0036 | 36/137 |
| 2005/0150138 A1 * | 7/2005 | Guzman | A43B 1/0036 | 36/137 |
| 2005/0150139 A1 * | 7/2005 | Guzman | A43B 1/0027 | 36/137 |
| 2006/0104046 A1 * | 5/2006 | Guzman | A43B 3/0005 | 362/103 |
| 2006/0104047 A1 * | 5/2006 | Guzman | A43B 1/0036 | 362/103 |
| 2007/0011919 A1 * | 1/2007 | Case | A43B 1/0036 | 36/132 |
| 2007/0021269 A1 * | 1/2007 | Shum | A61B 5/11 | 482/8 |
| 2007/0260421 A1 * | 11/2007 | Berner | A43B 3/0031 | 702/155 |
| 2009/0007458 A1 * | 1/2009 | Seiler | A43B 3/00 | 36/136 |
| 2009/0267783 A1 * | 10/2009 | Vock | A43B 1/0036 | 340/669 |
| 2009/0282703 A1 * | 11/2009 | Carson | A43B 21/00 | 36/139 |
| 2009/0284368 A1 * | 11/2009 | Case, Jr. | A43B 3/0005 | 340/539.1 |
| 2010/0115799 A1 * | 5/2010 | Welter | A43B 3/0005 | 36/137 |
| 2011/0306299 A1 * | 12/2011 | Wells | A43B 3/0021 | 455/41.3 |
| 2011/0314700 A1 * | 12/2011 | Case, Jr. | A43B 1/0036 | 36/132 |
| 2012/0023785 A1 * | 2/2012 | Barnes | A61F 5/14 | 36/141 |
| 2012/0297960 A1 | 11/2012 | Bader | | |
| 2013/0019694 A1 * | 1/2013 | Molyneux | A43B 3/0005 | 73/862.381 |
| 2014/0059894 A1 | 3/2014 | Khader | | |
| 2014/0109440 A1 | 4/2014 | McDowell et al. | | |
| 2015/0257679 A1 * | 9/2015 | Ross | G01L 5/0038 | 702/44 |
| 2015/0351665 A1 * | 12/2015 | Ross | A61B 5/0002 | 702/44 |
| 2016/0029926 A1 * | 2/2016 | Varnum | A61B 5/1036 | 73/172 |

FOREIGN PATENT DOCUMENTS

| | | |
|---|---|---|
| CN | 103271492 A | 9/2013 |
| CN | 105192986 A | 12/2015 |
| FR | 2855725 B3 | 8/2005 |
| JP | 2003169702 A | 6/2003 |
| JP | 2003228371 A | 8/2003 |
| WO | WO 95/26652 | 10/1995 |
| WO | WO 2015/095917 A1 | 7/2015 |

OTHER PUBLICATIONS

Shoe Transmitter, Encyclopedia of Espionage, Intelligence, and Security, pp. 1-3.

Threat in disguise: Hidden weapons—slide 5—NY Daily News.

Julie Taraska, "Why We Still Don't Have Cheap, Customizable 3-D-Printed Shoes for All," Co Design, pp. 1-10.

International Search Report and Written Opinion for International Application No. PCT/US2017/040697, dated Nov. 13, 2017, 13 pages.

International Preliminary Report on Patentability for International Application No. PCT/US2017/040697, dated Jan. 8, 2019, 9 pages.

* cited by examiner

WIRELESS MICROPHONE SYSTEM FOR AN ARTICLE OF FOOTWEAR

BACKGROUND

Field of the Invention

The present invention relates generally to articles of footwear for performance and more particularly to broadcasting and controlling the sound produced by the articles of footwear to an audience. Articles of footwear may include dance shoes, tap shoes, athletic footwear, hockey skates, figure skates, basketball shoes, snow skis, water skis, soccer cleats, football cleats, and the like.

Background Art

Tap dancing is a type of performance that combines dance and the sound produced by footwear worn by performers to create a performance for audiences to enjoy. The larger the audience of the performance, the more difficult it may become for every member of the audience to hear and enjoy the sound produced by the tap shoes during the performance. Microphones have been placed near the dancers or on the tap shoes of the dancers in order to capture the sound produced by the tap shoes, so that the sound may be transmitted to a Public Address (PA) system in order to broadcast the sound to the audience. However, reliable transmission of the sound produced by the tap shoes remains a problem.

SUMMARY

The following presents a simplified summary of the present disclosure in order to provide a basic understanding of some aspects described herein. This summary is not an extensive overview and is not intended to identify key or critical elements or to delineate the scope of the claims. The following summary merely presents various described aspects in a simplified form as a prelude to the more detailed description provided below.

Aspects of the invention include an article of footwear that produces an audio component for a performance. The article of footwear includes a rigid heel assembly that attaches to the article of footwear, the rigid heel assembly having a cavity with an open end. The cavity houses an audio transmission assembly that includes a transmitter. A microphone that converts the audio component of the performance into a digital audio signal is operatively connected to the audio transmission assembly. The transmitter wirelessly transmits the digital audio signal of the audio of the performance.

In another aspect of the invention, an article of footwear that produces an audio component for a performance comprising has a rigid heel assembly attached to the article of footwear, the rigid heel assembly having a cavity within and having an open end. An end cap couples to the rigid heel assembly and covers the open end of the cavity. A microphone retainer extends from the end cap towards a toe portion of the article of footwear. A microphone converts the audio component of the performance into a digital audio signal and the microphone is secured in the microphone retainer. A transmitter disposed within the cavity transmits the digital audio signal of the audio component of the performance and a power source disposed within the cavity is adapted to provide power to the microphone and the transmitter. The microphone retainer angles the microphone at an angle between about 20° and 70° off horizontal.

In another aspect of the disclosure, a storage assembly or rack for storing and recharging articles of footwear is disclosed. The rack includes a frame and plurality of compartments attached to the frame, each compartment stores an article of footwear. Each compartment also includes a recharging plug that engages with articles of footwear to recharge a power source attached to the article of footwear, each recharging plug is associated with a single compartment that stores the article of footwear.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

Figure 1:
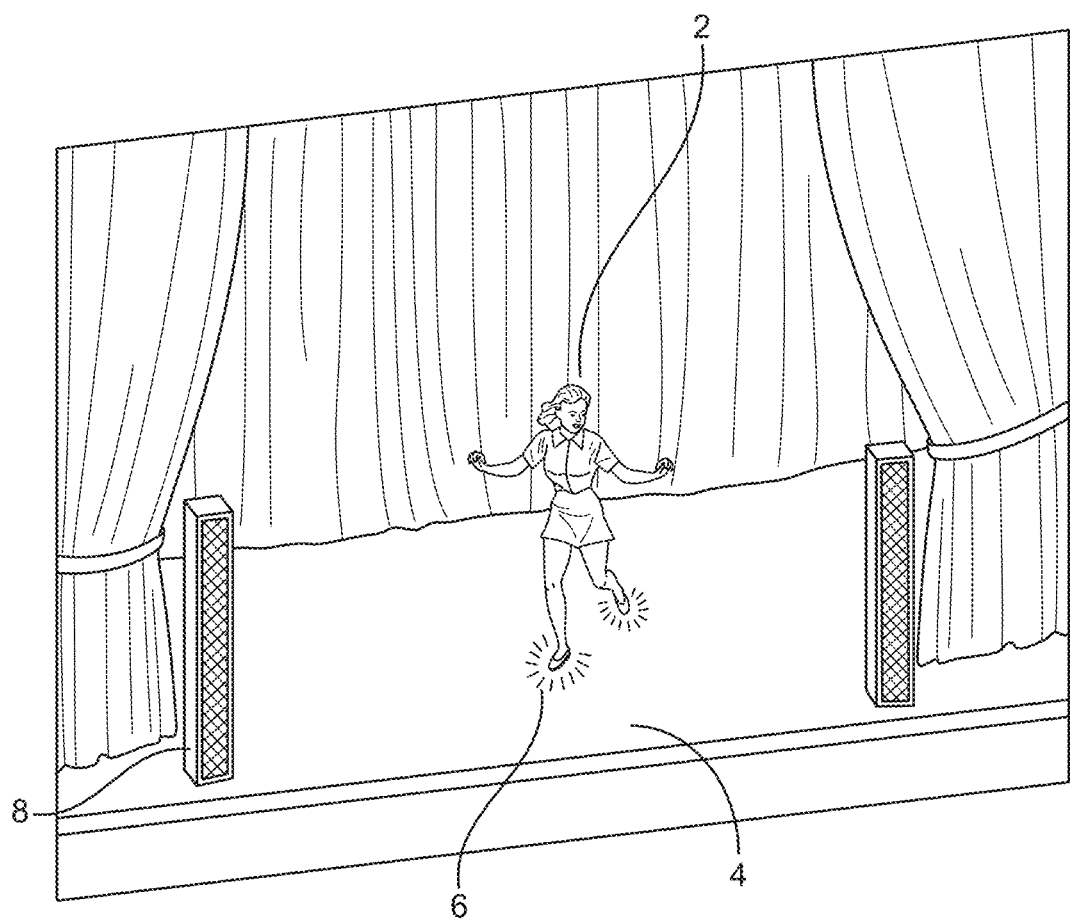
FIG. 1 illustrates a dancer performing a tap dance on a stage according to an embodiment.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

There are multiple types of activities and performances in which the sound created by a performer's footwear may augment the enjoyment experienced by audience members. Examples of such activities include theatrical performances, including, but not limited to, dancing, and athletic performances, including but not limited to, basketball, hockey, ice skating, ice dancing, skiing, water skiing, and the like.

In addition, there are multiple types of exhibition or performance dancing in which a dancer's performance is augmented by a dancer's shoe striking a dance floor to produce sound as part of the performance. These types of performances include tap dancing, clog dancing, Irish dancing, performance dancing, and the like. The dancer's shoes may be provided with one or more taps. For example, a tap may be attached to the heel of the dancer's shoe and a tap may be attached to a toe portion of the dancer's shoe. Each tap produces sound that can be controlled by the dancer during the performance. The taps may be constructed of metal or from another suitable material that increases the sound created when the dancer's shoe strikes the dance floor. The sound produced by the dancer's shoe and the dancer's movement may create an appealing performance for audience members to see and hear.

For example, FIG. 1 illustrates a tap dancer 2 on a stage 4 performing a tap dance. Each of the dancer's shoes has taps that create sound 6 that is essential for tap dancing. In order to serve large audiences and augment the enjoyment of the performance, microphones may be placed on stage 4 near the dancers or microphones may be placed on or in the tap shoes so that the sound may be transmitted from the microphones to a PA system 8. However, when the microphones are placed directly on the tap shoes, transmission of the sound to PA system 8 is often unreliable due to component failure. Component failure may include the failure of a microphone or a transmitter, for example. In some situations, components would be placed directly inside the heel of the tap shoes. Traditionally, tap shoe heels are made of leather, and the use of leather heels has contributed to the failure of components because the inflection of the leather heels during performances may damage components within the heel. The inflection of the leather heel increases over time and repeated use of the tap shoe, thus contributing to component failure.

Accordingly, some embodiments are directed to articles of footwear for reliably broadcasting to audience members high quality sound created during a performance. For example, the articles of footwear may be tap shoes, tap boots, high heels, shoes customized for a particular performance, clogs, and the like. The articles of footwear include a rigid structure for positioning and protecting audio transmission assembly 10 on a tap shoe 100 to convert the audio from the taps 106 and 108 hitting the dancing floor during the performance in order to broadcast the sound produced by each tap 106 and 108 to the audience. In some embodiments, all or a portion of audio transmission assembly 10 may be disposed within a rigid structure of the article of footwear.

Figure 2:
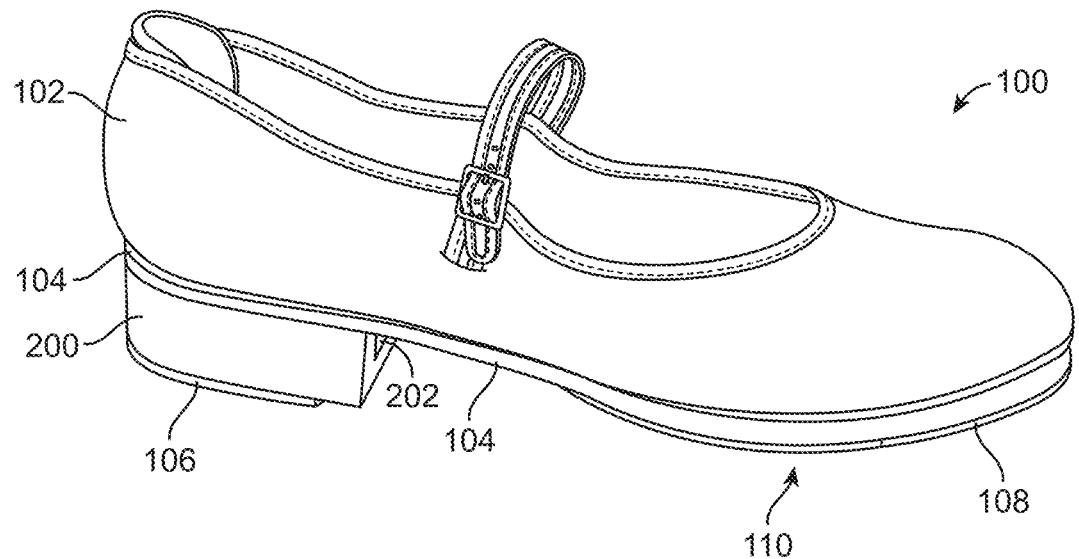
FIG. 2 illustrates a perspective view of an article of footwear according to an embodiment.

In some embodiments, as shown in FIG. 2, a tap shoe 100 generally includes an upper portion 102 and a sole 104 which may be attached in a number of different manners, such as stitching, adhesive, and the like. A heel 200 is attached to sole 104 of tap shoe 100. Tap 106 is attached to a bottom surface of heel 200 and a similar tap 108 is attached to sole 104 near a toe portion 110. Taps 106 and 108 may be of any suitable material for creating a sufficient amount of sound when the dancer taps the dancing floor with the taps 106 and 108, such as metal, hard plastic, and the like.

In some embodiments, the microphone is positioned between heel 200 and toe portion 110 in order for the microphone to pick up the audio from heel tap 106 and toe tap 108. Alternatively, multiple microphones may be attached to tap shoe 100. For example, a microphone may be positioned near heel tap 106 and toe tap 108.

The microphone may be placed in a suitable location on tap shoe 100 in order to pick up the sound equally from heel tap 106 and toe tap 108. Alternatively, the microphone may be placed in various other locations on tap shoe 100 in order to pick up the sound unequally from taps 106 and 108 on tap shoe 100. For example, it may be advantageous to place the microphone closer to heel tap 106, or alternatively, place the microphone closer to toe tap 108.

Figure 3:
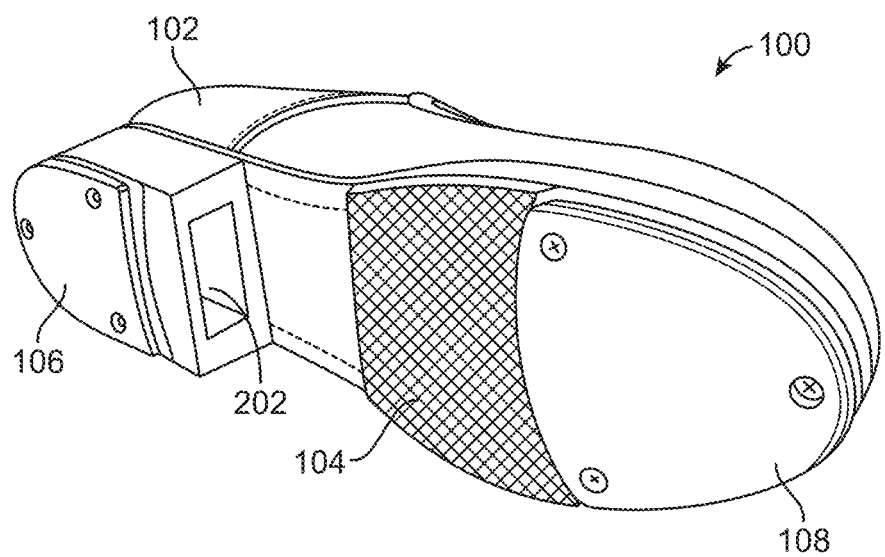
FIG. 3 illustrates a bottom perspective view of an article of according to an embodiment.
Figure 4:
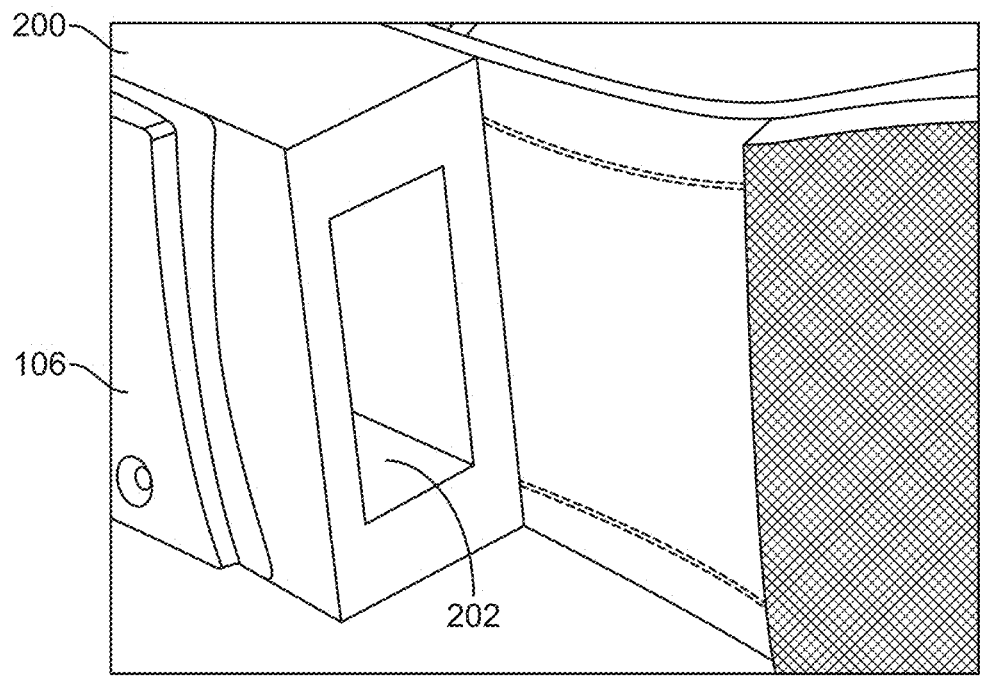
FIG. 4 illustrates a close up view of the article of footwear as illustrated in FIG. 3 according to an embodiment.

In some embodiments, heel 200 comprises a rigid structure configured to position and protect audio transmission assembly 10 for reliable transmission of the performance audio. Heel 200 has a cavity 202 with an open end. FIG. 3 illustrates a bottom perspective view of tap shoe 100 in which cavity 202 is visible. FIG. 4 illustrates a zoomed-in view of cavity 202 located within heel 200. An open end of cavity 202 may face toe portion 110 of tap shoe 100. Alternatively, the open end of cavity 202 may be located on a side of heel 200 or in a back of heel 200. Cavity 202 may house electrical components needed to transmit the sound picked up by the microphone to a backstage receiver so that the sound may be broadcast over a PA system for the whole audience to enjoy. The term backstage simply refers to off-stage or not on the dance floor. In some embodiments, a printed circuit board 300 having the necessary components may be housed within cavity 202. Alternatively, the components may be housed on multiple circuit boards housed within cavity 202. In certain embodiments, circuit board 300 may be encompassed in a waterproof envelope to protect circuit board 300 from moisture.

In some embodiments, heel 200 may be made of a rigid, hard, thermoplastic polymer, such as acrylonitrile butadiene styrene (ABS). Since heel 200 may be constructed of a rigid material, the rigid material may help avoid inflection that would damage circuit board 300 within heel 200. Accordingly, rigid heel 200 provides sufficient structure to protect circuit board 300. Rigid heel 200 may be manufactured in various manners, such as molding, casting, 3-D printing, and the like.

Figure 5A:
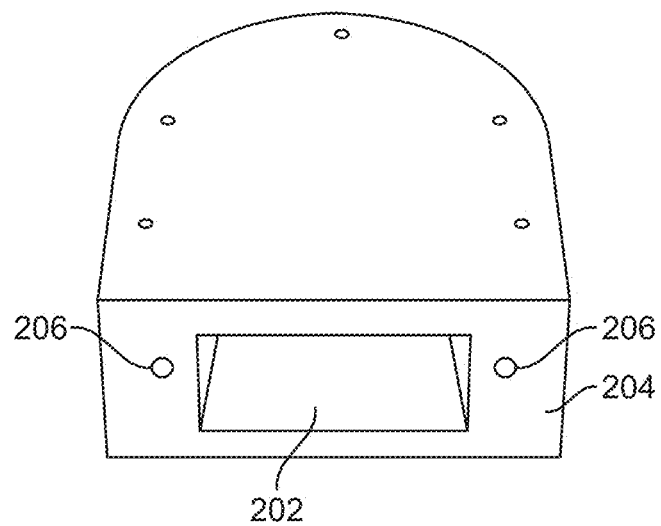
FIG. 5A illustrates a perspective view of a heel assembly of an article of footwear according to an embodiment.

In one embodiment, as shown in FIG. 5A, cavity 202 is located on a front surface 204 of heel 200. Front surface 204 of heel 200 may define openings 206 on opposite side of cavity 202. Openings 206 help secure circuit board 300 in cavity 202 by way of a retainer assembly 400 (illustrated in FIGS. 7-12, 14 and 15) by the use of screws. Circuit board 300 is secured to retainer assembly 400, and retainer assembly is coupled to front surface 204 of heel 200. Alternatively, retainer assembly 400 may be attached to heel 200 in a number of manners, such as adhesive, snap-fit connection, and the like.

Figure 5B:
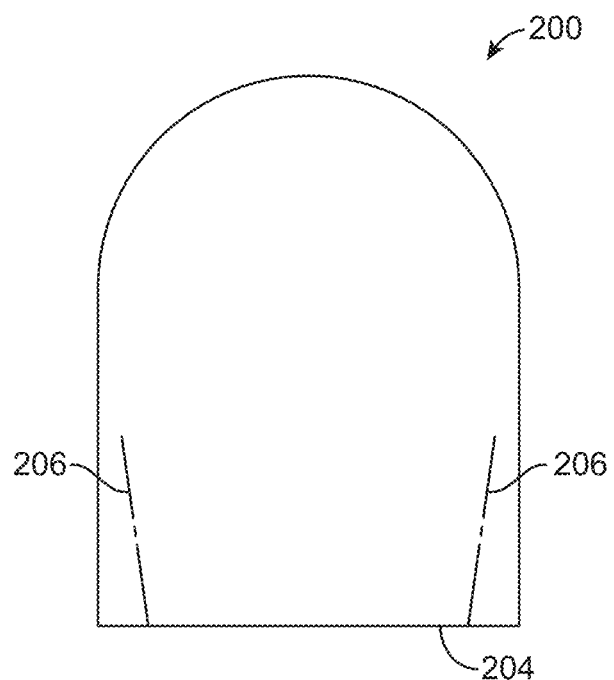
FIG. 5B illustrates a top view of a heel assembly of an article of footwear according to an embodiment.
Figure 5C:
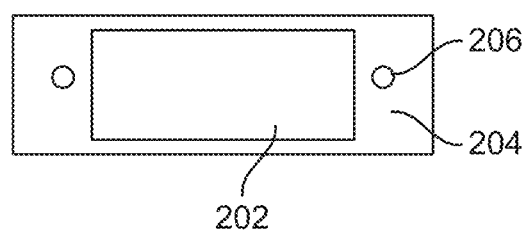
FIG. 5C illustrates a front view of a heel assembly of an article of footwear according to an embodiment.

In one embodiment, as shown in FIG. 5B, openings 206 of heel 200 are angled between 45° and 90° off front surface 204. The angle of openings may enable a screw to be inserted at an angle when retainer assembly 400 is coupled to heel 200. The angle may help prevent inertia of retainer assembly 400 and circuit board 300 inserted into cavity 202 during use of tap shoe 100.

Figure 6:
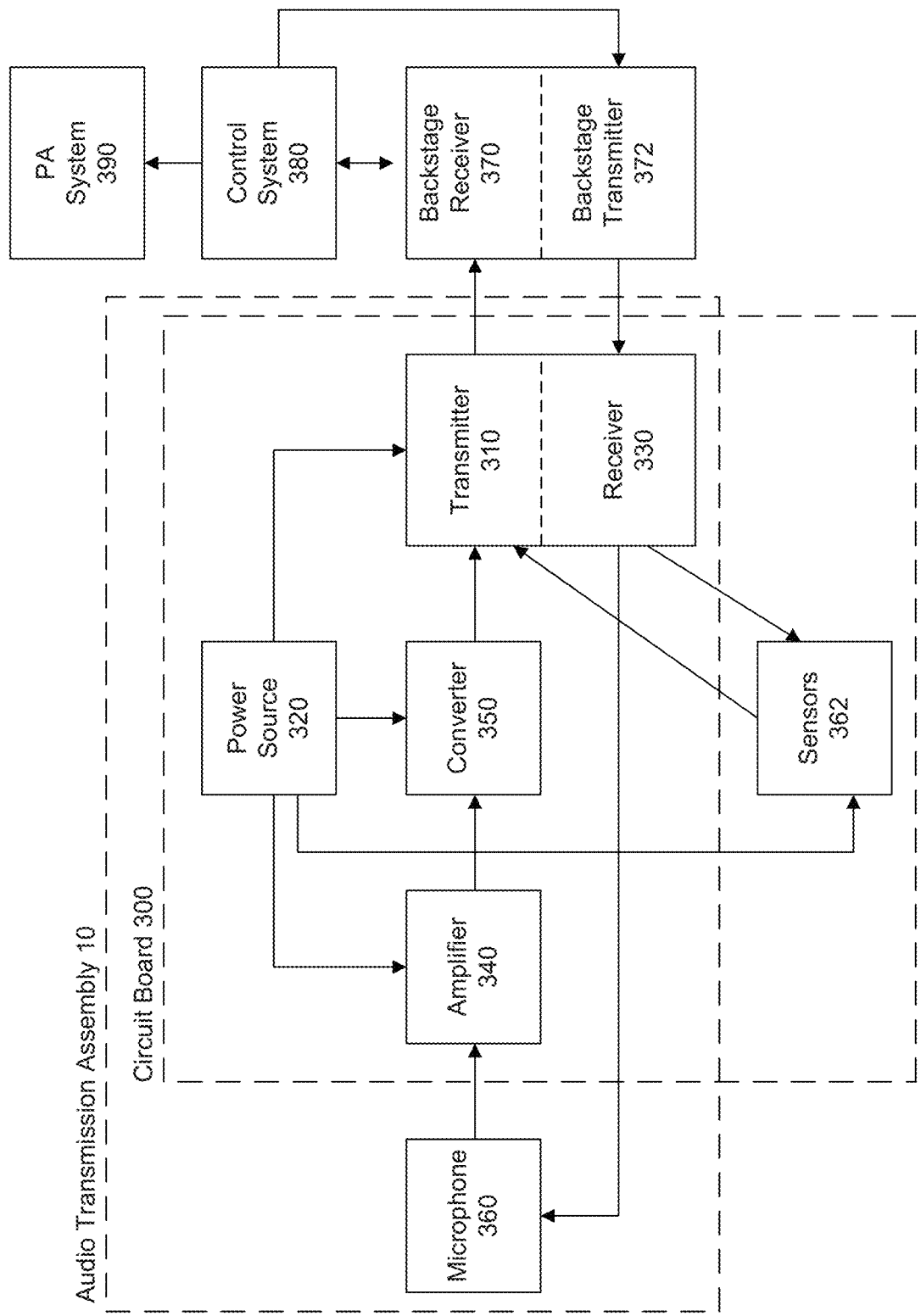
FIG. 6 illustrates an exemplary flowchart of a circuitry and sound system according to an embodiment.

In certain embodiments, as shown, for example, in FIG. 6, audio transmission assembly 10 may include a transmitter 310, a power source 320, a receiver 330, an amplifier 340, a converter 350, and a microphone 360. The components of audio transmission assembly 10 may be operatively connected to one another. All of the components of audio transmission assembly 10 may be disposed on one or more printed circuit boards 300. In certain embodiments, all of the components of audio transmission assembly 10 may be stored within cavity 202, or alternatively, some of the components of audio transmission assembly may be stored within cavity 202 and other components may be stored outside of cavity 202.

In certain embodiments, circuit board 300 may include transmitter 310, power source 320, receiver 330, amplifier 340, converter 350, and the like, as illustrated in FIG. 6. Microphone 360 may be located within cavity 202 or as discussed above, may be located in various locations on tap shoe 100 in order to accurately capture the audio from tap shoe 100. Microphone 360 is operatively connected to circuit board 300 to enable transmission of the audio picked up by microphone 360.

Microphone 360 picks up the audio of the performance and converts the audio into an analog or a digital signal. The digital signal may be amplified by amplifier 340. In some embodiments, converter 350 may convert the signal into an optical communication or a radio frequency (RF) communication which is transmitted by transmitter 310 to a backstage receiver 370. Backstage receiver 370 communicates with a control system 380 in which the signal may be manipulated. Control system 380 controls the entire system and enables the sound from tap shoe 100 to be mixed and prepared before the audio is broadcasted over a PA system 390.

In some embodiments, backstage receiver 370 receives separate signals from both tap shoes being worn by the dancer. In this manner, the sound for each shoe can be mixed and prepared before being broadcast over PA system 390. In some embodiments, backstage receiver 370 receives signals from both shoes of many dancers performing at the same time. The sound from each shoe may be mixed together and prepared before being broadcast over PA system 390.

In some embodiments, a backstage transmitter 372 may transmit signals to receiver 330 on audio transmission assembly 10. Receiver 330 may be a separate component from the transmitter 310, or alternatively, receiver 330 may be transmitter/receiver for communicating with the backstage transmitter/receiver. In this manner, control system 380 may communicate with circuit board 300 and microphone 360. For example, a mute signal could be send to a tap shoe if microphone 360 is malfunctioning or if microphone 360 is picking up static or too much background noise. Further, microphone 360 could be turned off after the performance finishes.

Power source 320 may be a rechargeable battery with a capacity of 1,000 mAh and an operating time of 7-8 hours at 100 mW. The rechargeable battery may have a mini universal serial bus (USB) plug 322 (illustrated in FIG. 9) to enable recharging for a power cord. Alternatively, power source 320 may be recharged wirelessly through inductive charging. Other suitable sources of power and recharging of power may be used.

Microphone 360 may operate at one or more different frequencies. For example, microphone 360 may operate in a range between 600-700 MHz spectrum, in a range between 1.4 and 1.5 GHz (1435-1525 MHz) spectrum, or in any other frequency as provisioned by law. In some embodiments, the microphone is waterproof as performances may involve water. For example, in some embodiments, audio transmission assembly 10 may include a waterproof layer comprising silicon or other suitable material for preventing water damage to the various components of audio transmission assembly 10.

Control system 380 enables a user to remotely control microphone 360, transmitter 310, receiver 330, amplifier 340, converter 350, and the like. Control system 380 may be a web-based application or stand-alone application with real time, configurable, multiuser access. Control system 380 may enable a user to modify and affect the audible characteristics of the sound produced by the footwear for the betterment of the performance and audience experience while simultaneously receiving data feedback.

Figure 7:
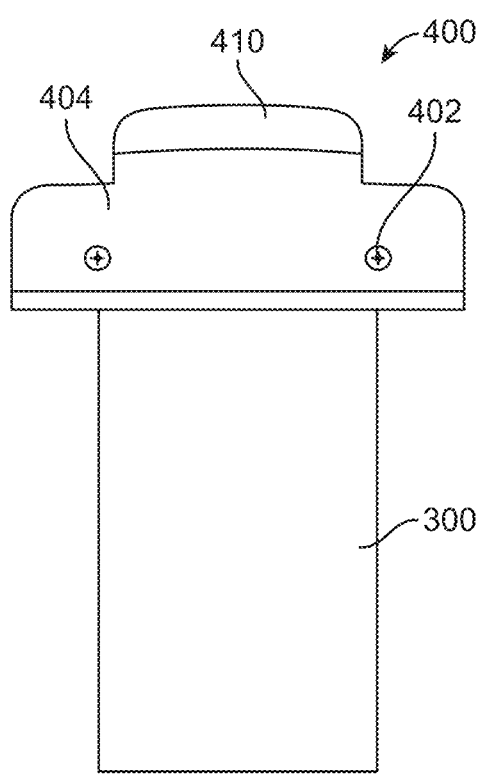
FIG. 7 illustrates a top view of a circuit board and a retainer assembly according to an embodiment.

In some embodiments, retainer assembly 400 helps secure circuit board 300 in cavity 202. FIGS. 7-10 illustrate circuit board 300 attached to retainer assembly 400. FIG. 7 illustrates a top view of circuit board 300 coupled to retainer assembly 400. Retainer assembly 400 may further include a microphone retainer 410 to position microphone 360 and secure microphone 360 in place.

Figure 8:
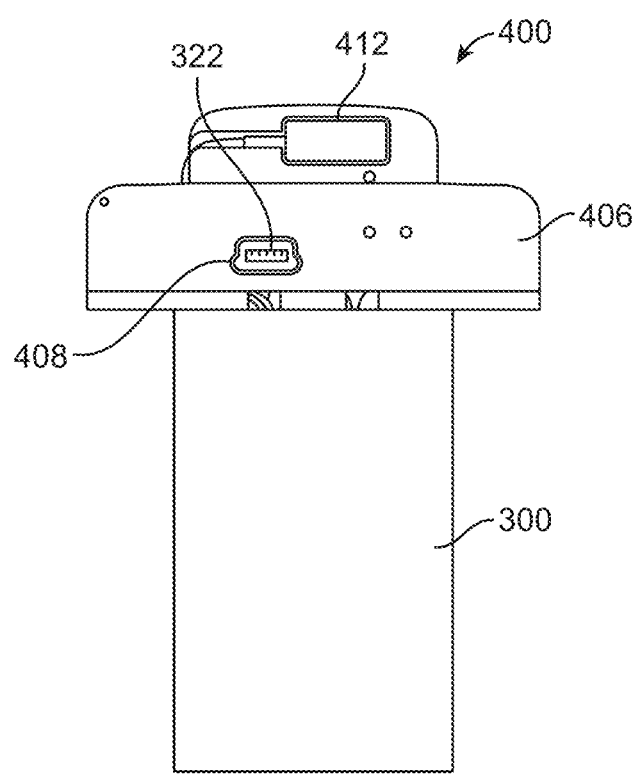
FIG. 8 illustrates a bottom view of a circuit board and a retainer assembly according to an embodiment.

In certain embodiments, as shown in FIG. 8, a bottom surface 406 of retainer assembly 400 includes an opening 408 adapted for mini USB plug 322. Mini USB plug 322 is operatively connected to power source 320 for recharging. Microphone retainer 410 may include a slot 412 in which to place and secure microphone 360.

Figure 9:
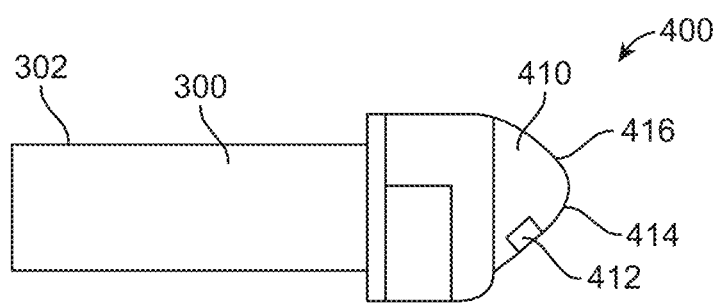
FIG. 9 illustrates a side view of a circuit board and a retainer assembly according to an embodiment.

In certain embodiments, as shown in FIG. 9, microphone retainer 410 may project from retainer assembly 400 in order to position microphone 360 in order to capture the sound produced by tap shoe 100. Further, microphone retainer 410 may have an inclined bottom face 414 in which slot 412 is disposed. Inclined bottom face 414 may be inclined at an angle of between 20° and 70°, but preferably around 40°. The angle of microphone retainer 410 helps position microphone 360 in a suitable position to capture the sound from both taps 106 and 108 of tap shoe 100. Further, microphone retainer 410 may have a curved upper surface 416 with a downward slope. In an embodiment, curved upper surface 416 may permit easy removal of retainer assembly and circuit board 300 from cavity 202.

Figure 10:
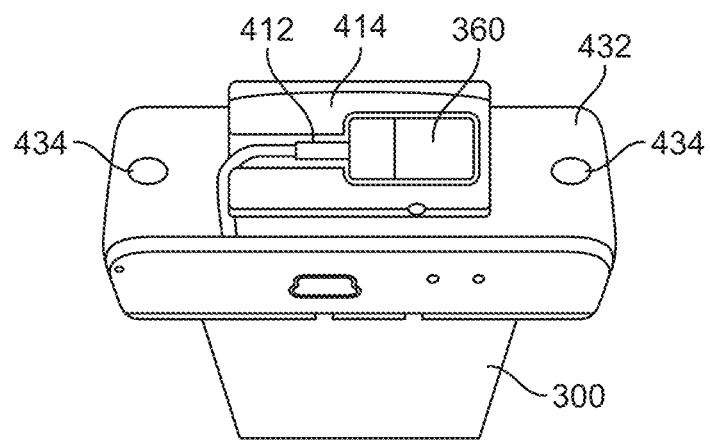
FIG. 10 illustrates a bottom front perspective view of a circuit board and a retainer assembly according to an embodiment.

In certain embodiments, as shown in FIG. 10, microphone 360 may be secured in slot 412 of inclined bottom face 414 of microphone retainer 410 by a number of different means, such as snap-fit connection, adhesive, and the like. A front face 432 of retainer assembly 400 may define openings 434 for attaching retainer assembly 400 to heel 200. Openings 434 may align with openings 206 on front face 204 of heel 200 to enable the attachment of retainer assembly 400 to heel 200, by the use of screws. Retainer assembly 400 may also be attached or coupled to heel 200 by adhesive, snap-fit connection, and the like.

Figure 11:
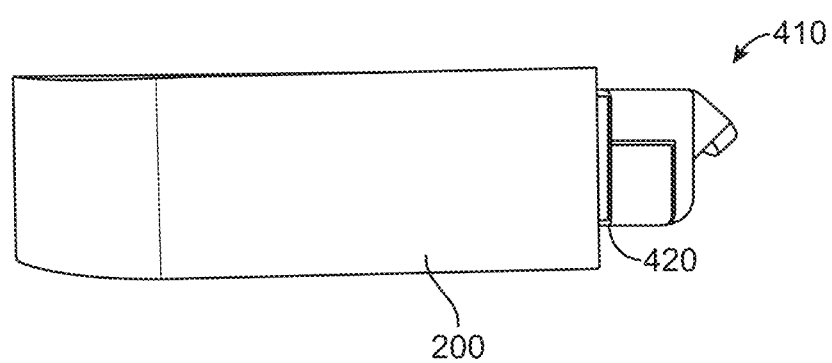
FIG. 11 illustrates a side view of a heel and a retainer assembly attached to the heel according to an embodiment.

In certain embodiments, retainer assembly 400 may be coupled to heel 200, as illustrated in FIG. 11. When circuit board 300 is inserted into cavity 202 of heel 200, an end cap 420 of retainer assembly 400 is flush with front face 204 of heel 200.

Figure 12:
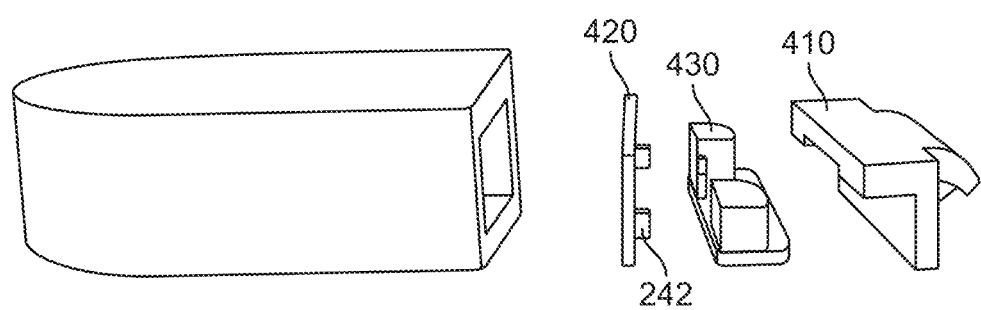
FIG. 12 illustrates an exploded side view of a heel and a retainer assembly according to an embodiment.

In certain embodiments, as shown in FIG. 12, retainer assembly 400 may include microphone retainer 410, end cap 420, and a middle portion 430. FIG. 12 illustrates each component of retainer assembly 400 integrally attached to each other. In some embodiments, screw 402 (illustrated, for example, in FIG. 7) couples microphone retainer 410 to middle portion 430. Prongs 424 of end cap 420 align with openings on middle portion 430 to secure end cap 420 to middle portion 430, which may be further secured by fasteners. Alternatively, retainer assembly 400 may be monolithic in which the entire retainer assembly 400 is a single piece.

Figure 13:
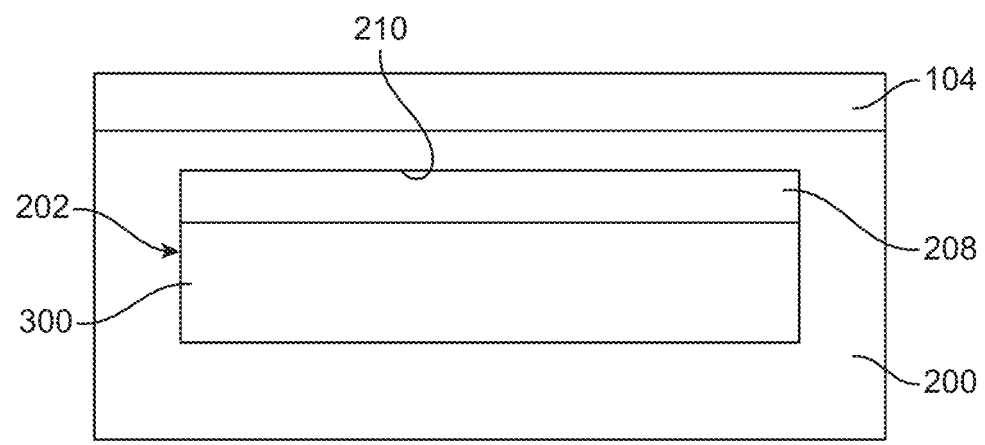
FIG. 13 illustrates a front cross-sectional view of a heel assembly as illustrated in FIG. 6 and a circuit board inserted in a cavity of the heel according to an embodiment.
Figure 14:
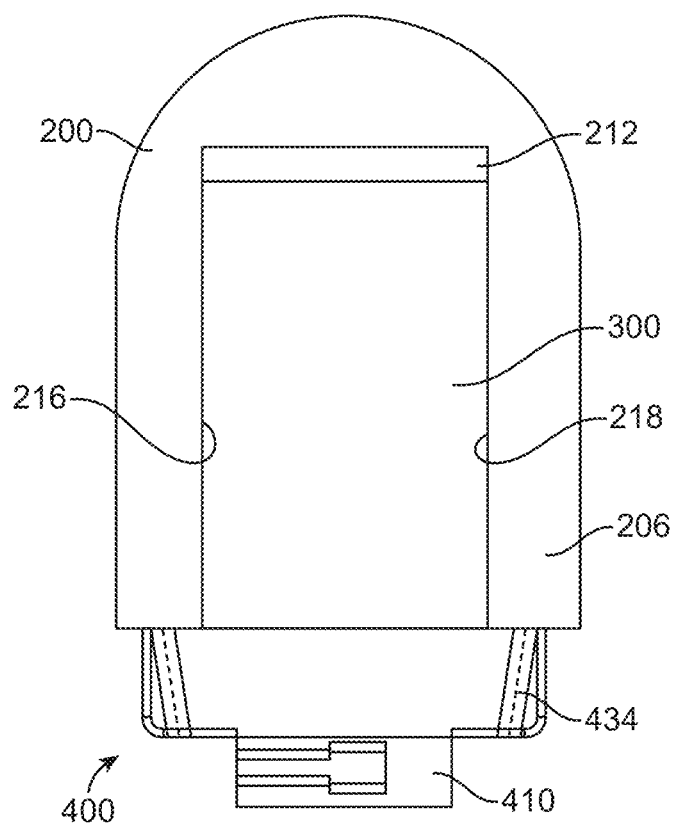
FIG. 14 illustrates a bottom cross-sectional view of a heel assembly and a retainer assembly according to an embodiment.

In certain embodiments, as shown in FIG. 13, circuit board 300 is inserted and secured in cavity 202. A gap 208 is located within the cavity between a top surface 302 of circuit board 300 and a top surface 210 of the cavity. Gap 208 helps protect circuit board 300 from damage during use.

In certain embodiments, as shown in FIG. 13, a gap 212 is located between circuit board 300 and the rear of cavity 202. Circuit board 300 is secured by inner sidewalls 216 and 218 of cavity 202. In addition, as discussed above, openings 206 may be angled. Openings 434 and openings 206 may align to enable retainer assembly 400 to be attached to heel 200. Therefore, openings 206 and openings 434 may be angled between 45° and 90°. Screws may be inserted into openings 434 and 206 to help secure retainer assembly 400 to heel 200. The angle of the screws helps prevent inertia of retainer assembly 400 and circuit board 300 during performances.

Figure 15:
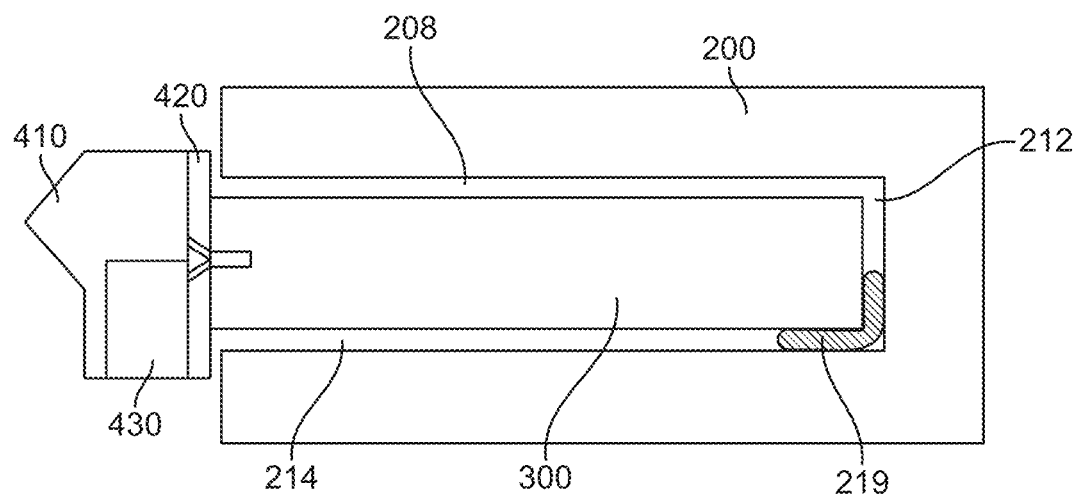
FIG. 15 illustrates a side cross-sectional view of a heel assembly and a retainer assembly according to an embodiment.

In some embodiments, circuit board 300 is inserted into cavity 202 with gaps 208, 212, and 214 found between the top, rear, and bottom of circuit board 300 and cavity 202. FIG. 15 illustrates these gaps in a side cross-sectional view of heel 200, retainer assembly 400, and circuit board 300. Gaps 208, 212, and 214 allow movement of circuit board 300 during performance and normal use of tap shoe 100. A pad 219 may be inserted into the bottom rear of cavity 202 to help reduce movement and protect circuit board 300 during use. In some embodiments, circuit board 300 is secured to retainer assembly 400 by screws 422.

Figure 16:
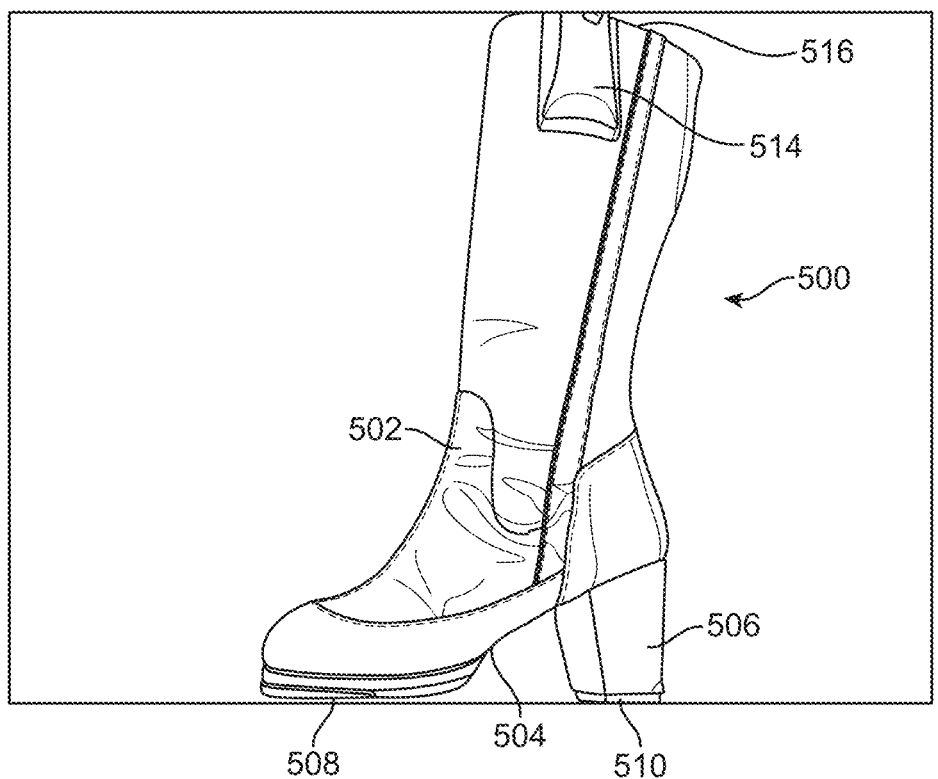
FIG. 16 illustrates a perspective view of an article of footwear according to an embodiment.
Figure 17:
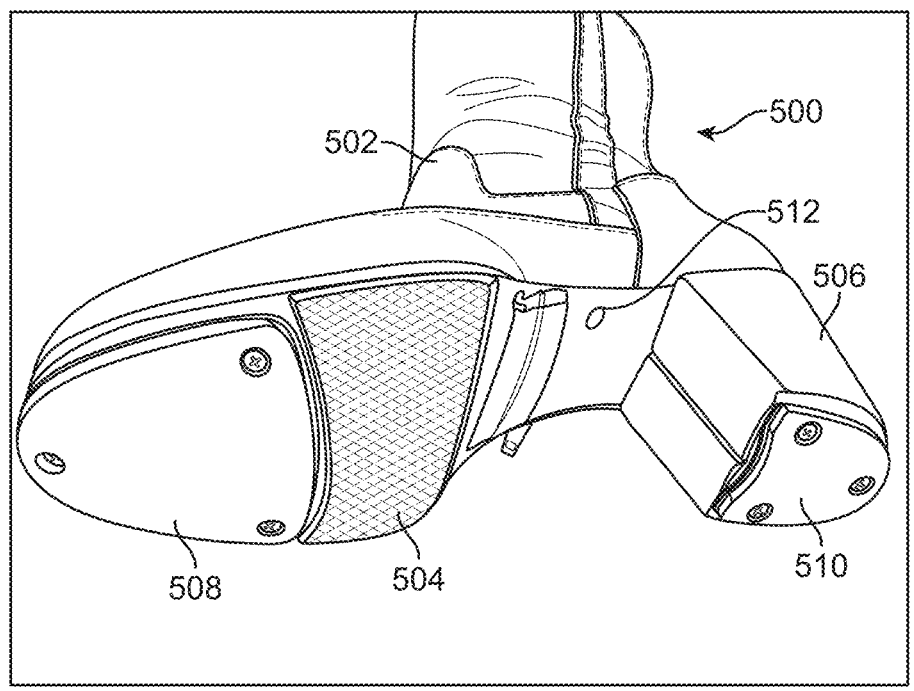
FIG. 17 illustrates a bottom perspective view of an article of footwear according to an embodiment.

In one embodiment, as shown in FIGS. 16 and 17, a boot tap shoe 500 includes an upper portion 502, a sole 504, a heel 506, a front tap 508, a heel tap 510, and microphone cavity 512 in sole 504 of boot tap shoe 500. A microphone may be placed in microphone cavity 512 to capture sound produced by boot tap shoe 500. The microphone may be connected to a transmitter and/or receiver that is located in a pocket 514. In some embodiments, pocket 514 may be located on the outside of boot tap shoe 500 near an upper edge 516 of upper portion 502. Alternatively, the transmitter and/or receiver may be located within boot tap shoe 500.

One benefit of the transmitter being located on the article of footwear versus the performer is the performer may not be physically constrained by transmitter/receiver.

In some embodiments, the transmitter transmits the audio produced by boot tap shoe 500 during the performance to backstage receiver 370. The microphone may be connected to the transmitter and/or receiver by an extension cable. Alternatively, the microphone may be connected in an any operable manner to the transmitter and/or receiver.

Figure 18:
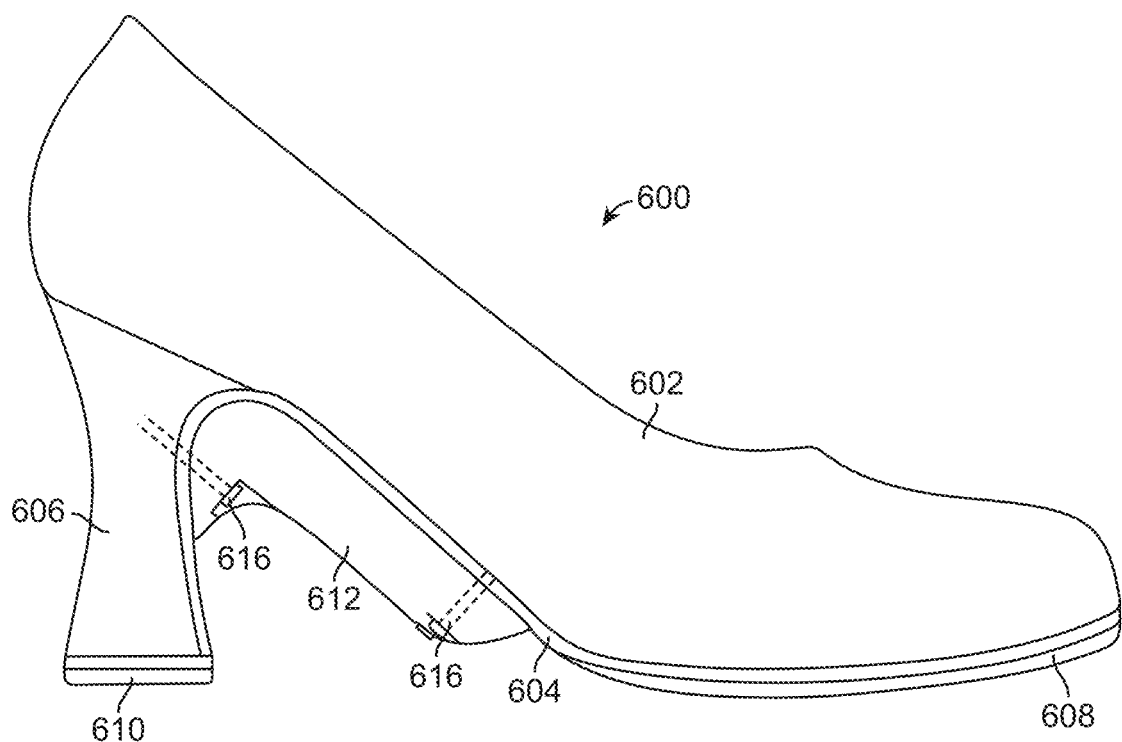
FIG. 18 illustrates a side view of an article of footwear according to an embodiment.
Figure 19:
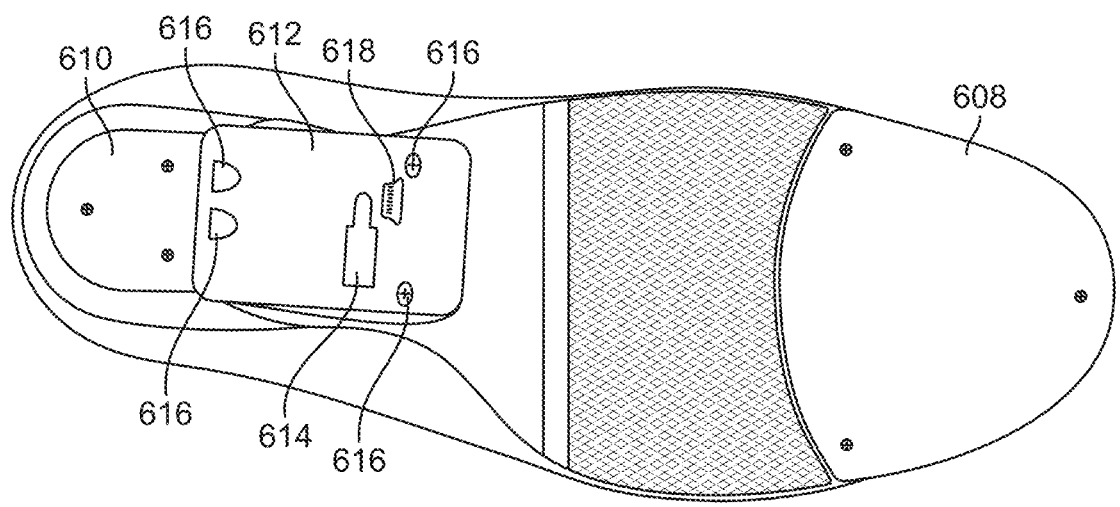
FIG. 19 illustrates a bottom view of an article of footwear according to an embodiment.

In one embodiment, as shown FIGS. 18 and 19, a tap shoe 600 includes an upper portion 602, a sole 604, a heel 606, a front tap 608, and a heel tap 610, and a retainer assembly 612. Heel 606 is too small to house a cavity for the circuit board so retainer assembly 612 is secured to sole 604 of tap shoe 600 between heel 606 and front tap 608, preferably on an arch of tap shoe 600. Retainer assembly 612 may be secured to the arch of tap shoe 600 in a number of different manners, such as a snap-fit, fasteners, adhesive, and the like. FIG. 16 illustrates retainer assembly 612 secured to the arch of tap shoe 600 by a plurality of screws 616.

A microphone retainer slot 614 is formed in retainer assembly 612 to position and secure the microphone between front tap 608 and heel tap 610 in order to capture the audio from both taps 608 and 610 during the performance. Circuitry is disposed within retainer assembly 612 in order to transmit the audio component of the performance from the microphone to the backstage receiver in order to broadcast the audio over a PA system. Retainer assembly 612 further includes an opening 618 adapted for mini USB plug 322. Mini USB plug 322 is operatively connected to power source 320 for recharging.

Figure 20:
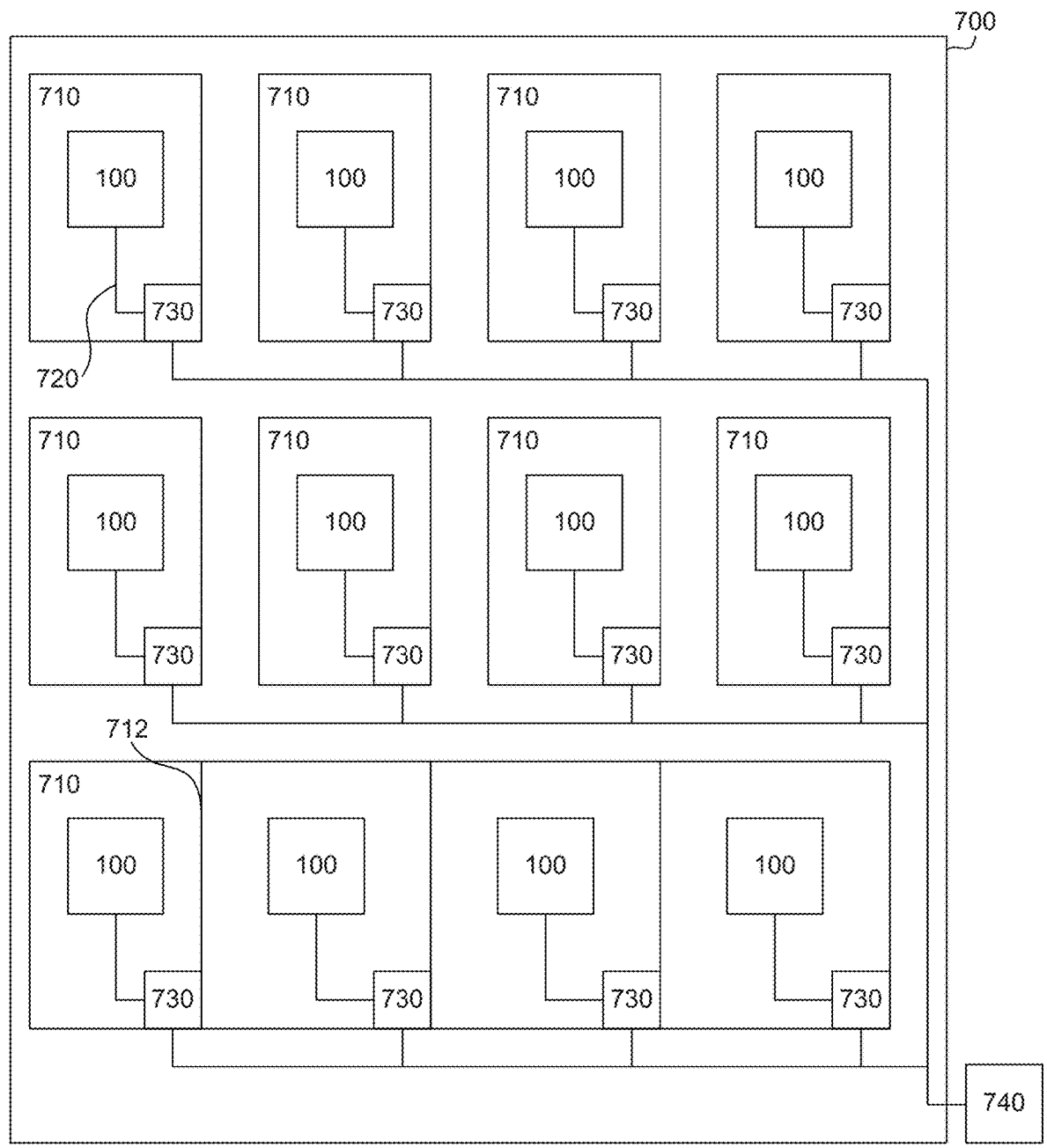
FIG. 20 illustrates a block diagram for a storing and recharging rack for articles of footwear according to an embodiment.

Between performances or other uses of the tap shoes, the tap shoes need to be stored and power source 320 needs to be recharged. In certain embodiments, a plurality of tap shoes 100 are stored in a storage assembly that is capable of storing and recharging power source 320 of each individual tap shoe 100. In some embodiments, as illustrated in FIG. 20, tap shoes 100 are stored in a storage rack 700. The storage rack may include a plurality of compartments 710. Compartments 710 may be individual compartments for storing a single tap shoe 100, or each compartment may store a pair of tap shoes. Alternatively, compartments 710 may be separated by a separating wall 712, in which each compartment 710 is separated from an adjacent compartment 710 by separating wall 712. Each compartment 710 may have a power cord 720 for recharging each tap shoe 100. Each power cord has a port 730 that enables power cord 720 to connect to a power source 740 for recharging each individual tap shoe 100. The power source may be integral to or separate from storage rack 700.

Figure 21:
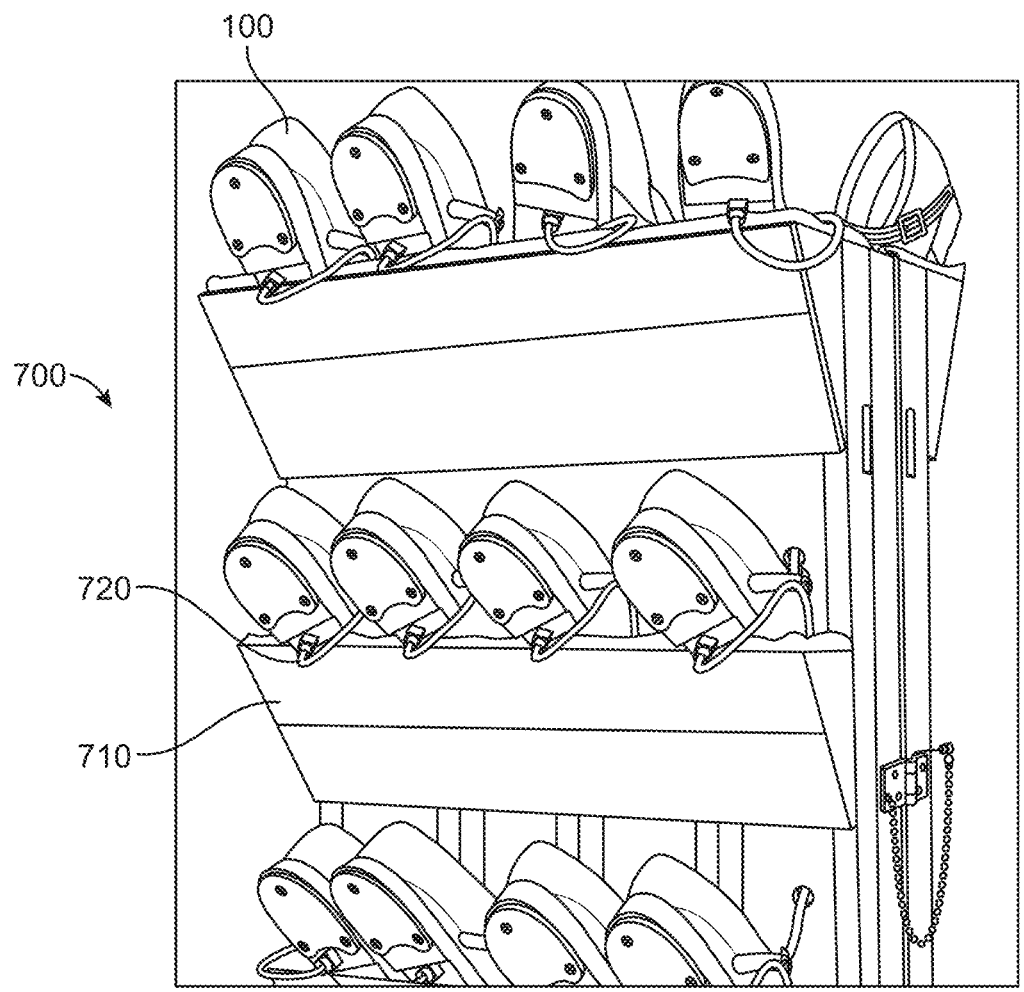
FIG. 21 illustrates a storing and recharging rack for articles of footwear according to an embodiment.

In some embodiments, such as FIG. 21, storage rack 700 is capable of storing tap shoes 100 and recharging power source 320. Storage rack 700 may include a number of compartments 710 that are coupled to the rack or monolithic with the rack 700. Each compartment 710 is for storing individual tap shoes or a pair of tap shoes. Each compartment 710 may have a corresponding recharging structure for recharging power source 320 of the tap shoe. In some embodiments, each compartment 710 may have a mini USB power cord to charge an individual tap shoe. Alternatively, each compartment 710 may have an induction coil for wireless induction charging, or another method of charging known to those skilled in the art. Further, since each tap shoe has a heel, rack 700 may have a various rows for storing multiple tap shoes.

The tap shoes may be stored in a variety of different positions. For example, the tap shoes may be stored in a horizontal position, vertical position, angled position, upside down, on the tap shoe's side, and the like.

In some embodiments, tap shoes may be stored in individual closable containers, in which the tap shoe may be placed in the container and attached to the charging component and the container may be closed.

In some embodiments, a performer's footwear may further include by the use of one or more additional sensors 362, such as an accelerometer, Global Positioning System (GPS) sensor, and the like. An accelerometer sensor may enable the position, speed and acceleration of the article of footwear to be determined and kept track of. The speed and acceleration data may be transmitted to backstage receiver 370 which may be used to help augment the performance. For example, the data may be used to augment physical or audio parameters of the performance. In some embodiments, at predetermined positions, speeds and/or accelerations of the articles of footwear, control signals may be sent to mute/turn on microphone 360, alter the gain of the signal, alter the level of the signal, broadcast a sound effect to PA system 390, alter physical parameters of the performance, and the like. Example of sound effects may be to add a "whoosh" sound when a dancer kicks up a leg, augment the sound the sound made by the footwear, and the like. Examples of physical parameters may be lighting, broadcasting of visual images, design set changes and the like.

The GPS sensor may enable the position of the performer to be determined. The position of the performer may be transmitted to backstage receiver 370 which may be used to help augment the performance. In some embodiments, the position data may be used to augment the performance. For example, at predetermined performer locations, control signals may be sent to mute/turn on microphone 360, alter the gain of the signal, alter the level of the signal, send a sound effect to PA system 390, alter physical parameters of the performance, and the like.

In addition, the data gathered from the sensors on the article of footwear may be broadcast to the audience in a form that can be appreciated by the audience in order to augment the performance experience. The data may be displayed to the audience visually, audibly, and/or tactilely for the betterment of the performance for the audience. For example, position data may be broadcasted visually to the audience to represent the speed, location, and current direction of the performer, such as, for example, the speed and direction of a hockey player. Statistical analysis may also be transmitted to the audience, such as, for example, average speed of the performer, the number of steps taken by the performer, the distance traveled by the performer, the path the performer followed during the performance, comparison of performers, and the like.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An article of footwear that produces an audio component for a performance comprising:
    a rigid heel assembly attached to the article of footwear;
    a cavity within the rigid heel assembly having an open end;
    an end cap coupled to the rigid heel assembly and covering the open end of the cavity;
    a microphone retainer that extends from the end cap towards a toe portion of the article of footwear;
    a microphone, wherein the microphone is housed on an underside of the footwear, the microphone configured to capture an audio component of a performance produced by the article of footwear and configured to convert the audio component of the performance into a digital audio signal, the microphone being secured in the microphone retainer;
    a transmitter disposed within the cavity, the transmitter configured to transmit the digital audio signal of the audio component of the performance to a backstage receiver; and
    a power source disposed within the cavity and adapted to provide power to the microphone and the transmitter,
    wherein the microphone retainer angles the microphone at an angle between about 20° and 70° off horizontal.

2. The article of footwear according to claim 1, wherein the microphone retainer angles the microphone at an angle about 40° off horizontal.

3. The article of footwear according to claim 1, wherein a front face of the microphone retainer has a slot,
    wherein the slot secures the microphone in the microphone retainer, and
    wherein the microphone retainer is disposed between the heel assembly and the toe portion of the article of footwear.

4. The article of footwear according to claim 1, wherein a bottom face of the endcap defines an opening to enable recharging of the power source.

5. The article of footwear according to claim 4, wherein the opening defined by the bottom face of the endcap enables a mini universal serial bus plug to pass through the opening to enable recharging of the power source.

6. The article of footwear according to claim 1, wherein a front face of the endplate defines an opening to enable a connection between the microphone and the transmitter and power source.

7. The article of footwear according to claim 1, wherein a top surface of the microphone retainer has an arc-shape that angles downward off horizontal.

* * * * *